Patented June 30, 1953

2,643,997

UNITED STATES PATENT OFFICE 2,643,997

ISOLATION AND PURIFICATION OF STREPTOMYCIN PHOSPHATE

David L. Johnson, Syracuse, N. Y.

No Drawing. Application April 2, 1948,
Serial No. 18,720

2 Claims. (Cl. 260—210)

This invention relates to streptomycin and to improved processes for its isolation from fermentation broths and its purification.

It is an object of this invention to provide simple, effective, processes which will achieve efficient recovery of the streptomycin contained in a fermentation broth.

It is a further object of this invention to provide processes which will produce streptomycin products having a high degree of purity and potency.

It is a still further object of this invention to provide improved processes for the purification of streptomycin which has been isolated from fermentation broths by known methods or by methods other than those of the present invention.

It is a still further object of this invention to provide a new antibiotic, streptomycin phosphate, which does not have the disadvantage of producing toxic side effects such as have resulted from the administration of other streptomycin salts.

Heretofore, various methods have been proposed for the extraction and purification of streptomycin. Such proposals include the following:

(1) A. Adsorption on charcoal at pH 7.0 and elution with 0.5% HCl in methanol (Waksman and Schatz, 1945; Le Page and Campbell, 1946; Carter, Clark, Dickman, Loo, Skell and Strong, 1945).
 B. Concentration of neutral eluate (Le Page and Campbell, 1946).
 C. Precipitation of streptomycin hydrochloride, by addition of a large excess of ether or acetone to the eluates or concentrates (Waksman and Schatz, 1945; Le Page and Campbell, 1946; Carter et al., 1945).
(2) Charcoal adsorption at low pH to remove pigments followed by extraction of the streptomycin as in 1 (Le Page and Campbell, 1946; Carter et al., 1945).
(3) Adsorption on charcoal at pH 7.0 followed by elution of water-free charcoal cake with anhydrous methanolic hydrogen chloride, concentration of neutral eluate and precipitation of the streptomycin hydrochloride with acetone Waksman and Schatz, 1945).
(4) A two-stage process involving solution of the first precipitate in water, adsorption on charcoal, elution with acid-methanol, concentration and precipitation (Le Page and Campbell, 1946).

The adaption of the foregoing processes to large scale manufacturing conditions presented the following difficulties: (a) the construction of acid-resistant plant; (b) the use of large volumes of methanol, with consequent high cost of production; (c) the production of large volumes of methanol-acetone mixtures, presenting difficulties of fractionation; (d) the difficulty of recovering small weights of a hygroscopic product from large volumes of solvent.

In accordance with the present invention streptomycin and particularly the phosphate salt is obtained from filtered fermentation broths by the following sequence of steps:

1. Adsorption on activated carbon.
2. Elution with phosphoric acid.
3. Neutralization of the eluate with an ion exchange column.
4. Concentration of the neutral eluate.
5. Precipitation of the streptomycin phosphate by the addition of tertiary butanol to the concentrate.
6. Separation of the precipitate.
7. Solution of precipitate in water.
8. Carbon clean-up of the solution.
9. Precipitation by adding solution to methanol or ethanol.
10. Separation and drying of the purified precipitate to yield an improved dry stable streptomycin phosphate of high activity and therapeutic usefulness.

This process has many advantages. For example; (i) In the first stage of the extraction, streptomycin is eluted from the charcoal with dilute aqueous phosphoric acid, enabling stainless steel equipment to be used when volumes are large. (ii) The organic solvent elution stage is delayed until a considerable volume diminution has been effected, decreasing solvent requirements to at least one-tenth of those employed in other processes. (iii) Precipitation of streptomycin is not accomplished until volumes are comparatively small. (iv) The volume of methanol-acetone mixture produced during the process is at a minimum. (v) The use of aqueous phosphoric acid as an eluting agent gives substantially pigment-free eluates.

The various operations required for carrying out the above steps are described more fully below.

To the fermentation mixture 3% Speed Plus Dicalite (commercial diatomaceous earth) is added and this mixture is filtered. The filtered broth is adjusted to pH 8 with sodium carbonate (or hydrochloric acid). Then an amount of activated carbon determined by the amount of streptomycin present is added to the filtered broth and the mixture is stirred for 1 hour until adsorption is complete. The carbon slurry is filtered and the carbon cake is washed thoroughly with water, finally with distilled water, and air is blown through the cake to remove excess liquid. The carbon is eluted with a volume of dilute phosphoric acid (prepared with distilled water) which is one-tenth of the broth volume. Sufficient $H_3PO_4$ (usually 0.43% to 0.85%) is used to bring the elution mixture to pH 2.0. The elution mixture is stirred for 1 hour and then filtered. The carbon cake is washed well with distilled water and then discarded or a second elution made. The acid eluate is passed through an anionic exchange column to remove excess acid and is brought to a pH of 7.0. (The pH may go above 7; if so, adjust with $H_3PO_4$). The neutral eluate is then concentrated under reduced pressure (less than 120 mm. pressure) until the streptomycin content of the concentrate is at least 20,000 units/ml. Any precipitated material is removed and the clear solution is treated with tertiary butyl alcohol. Two volumes of tertiary butyl alcohol are added to each volume of streptomycin phosphate concentrate. An oil containing streptomycin and some impurities separates out and more complete separation is made by centrifuging the mixture. The tertiary butyl alcohol layer containing color, impurities and a small amount of streptomycin is removed. The oil of streptomycin is dissolved in water to a concentration of 40,000 units/ml., any insoluble material is removed, and the tertiary butyl alcohol precipitation step is repeated. The tertiary butyl alcohol step is repeated a third time and the oil is dissolved in enough water to yield a final concentrate containing from 100,000 to 200,000 units/ml. The water insoluble material is removed. The streptomycin phosphate concentrate is adjusted to a pH of 6.0 with $H_3PO_4$ and 6% Darco G60 (commercial powdered charcoal) carbon is added, and the mixture is stirred for 1 hour to remove pyrogens. The mixture is filtered using pyrogen-free equipment and the carbon cake is washed with a small amount of pyrogen-free water. The solution is then filtered through an Ertel filter (asbestos discs) which removes any microorganisms present and may also further reduce the pyrogen content of the solution. The sterile solution is now ready for drying. This may be accomplished either by lyophilization or alcohol precipitation. For alcohol precipitation, 5 volumes of the streptomycin final concentrate are added slowly with stirring to 95 volumes of absolute methanol. The precipitate of streptomycin phosphate is filtered off, washed with absolute methanol and/or acetone, and dried. The streptomycin phosphate is a white-appearing solid that pulverizes readily to a fine powder.

Carbon adsorption and elution

The amount of carbon required will depend upon the type of medium used for growth. We have found that the presence of dextrin interferes in the adsorption of streptomycin. It is thought that this interference may be of the competitive type. The most accurate way to determine the amount of carbon required is to carry out preliminary adsorption experiments and determine the minimum amount of carbon required to adsorb all of the streptomycin.

The pH at which the adsorption is carried out is important. pH 8 is the most satisfactory adsorption pH. If a higher pH is employed, the streptomycin stability must be considered since the stability decreases with increasing pH. At lower pH values, especially below pH 6 in an adsorption from filtered broth, the adsorptive capacity of the carbon diminishes with decreasing pH. A range of pH 6–9 can be employed.

The elution of the adsorbed streptomycin from the carbon is best carried out at a pH from 1.8 to 2.2. The elution is not complete when a pH of 3 or above is used, while if a pH below 1.8 is used no additional streptomycin is eluted and the additional acid present must subsequently be removed.

The acid most satisfactory for elution of the streptomycin from the carbon is phosphoric acid. It has been found to give material of the best purity with the highest yields. Formic acid has been found to give high yields but material of low purity is obtained. HCl, $H_2SO_4$ and acetic acid are other acids which can be employed.

The elution volume used is one-tenth the filtered broth volume. The volume is not critical and can be increased or decreased without effect upon the elution of streptomycin. Sufficient liquid must be used to give a mixture of low enough viscosity so that adequate mixing takes place.

It is necessary to use pure distilled or deionized water as a medium for the phosphoric acid to make the eluting mixture, since the subsequent portion of the isolation procedure does not employ a step to remove inorganic cations.

Ion exchange neutralization

In this step the acid eluate is brought to neutrality by removing the excess $PO_4$ anions present and replacing with hydroxyl ions. It may be desirable to use a resin anion exchange substance that does not split salts (remove anions) at pH values much above 7. Amberlite IR4B (commercial anion exchange resin) does not split salts, while Ionac A300 (commercial anion exchange resin) will remove anions to give a solution with a pH of above 12.

It may be desirable to use a salt splitting anion exchanger, inasmuch as the increase in pH, which develops, causes a decrease in the solubility of certain dissolved impurities which precipitate and thereby effect some purification of the streptomycin solution. After the pH has been thus raised to a value above 7, it is necessary to add phosphoric acid to bring the pH of the solution back to 7.

When Ionac A300 (commercial anion exchange resin) is regenerated with $Na_2CO_3$ solution, the resin will bring the pH of the streptomycin solution up to around 9. This is not sufficiently high to cause enough destruction of the streptomycin to be objectional. If NaOH solution is used to regenerate the Ionac A300 (commercial anion exchange resin), it is possible to prepare essentially the free streptomycin base. In this way various salts of streptomycin may be easily prepared. The streptomycin phosphate solution is passed over the Ionac (commercial anion exchange resin) column and the emerging solution contains the streptomycin as the free base. Any acid may be added to such a solution to form any desired salt with the streptomycin.

It is necessary to use an anion exchange removal of the excess acid since the remainder of the process makes no provision for removal of the products of the usual neutralization of any excess acid. The use of the exchange substances thereby simplifies the process and allows the preparation of material with low ash content by a simple reduced pressure concentration.

Concentration

The neutral eluate is concentrated under reduced pressure to a volume such that the concentration of the streptomycin is 20,000 units/ml. The temperature at which the concentration is carried out is very important. The lower the temperature of concentration, the less destruction of streptomycin occurs and as a result the higher the purity will be. This decomposition seems to increase in rate as the concentration of the streptomycin in the solution increases. The temperature of concentration should not exceed 60° C. and would best be carried out at 20° C. or below.

The streptomycin solution may be concentrated (by distillation of the water under reduced pressure) to a concentration of above 100,000 units per ml. However, it is more desirable to stop the concentration when a value of from 20,000 to 40,000 units/ml. has been attained. This is the desirable range to be used in the tertiary butyl alcohol precipitation step that follows and it also lessens attending decomposition that occurs on further concentration of the streptomycin.

Streptomycin phosphate solutions of from 20,000 units/ml. and above can be conveniently concentrated by making use of the tertiary butyl alcohol precipitation step followed by dissolution of the concentrated streptomycin to the desired concentration.

Tertiary butyl alcohol precipitation

The concentrate containing 20,000 units/ml. of streptomycin phosphate is treated with twice its volume of tertiary butyl alcohol. (The constant boiling (80° C.) mixture of tertiary butyl alcohol and water, containing 21.76% water, can be used satisfactorily). The quantity of tertiary butyl alcohol used for one volume of streptomycin phosphate concentrate may be varied from one volume to ten volumes. The most satisfactory range, as far as purification and low loss of units is concerned, is from two to three volumes. As the amount of tertiary butyl alcohol added is increased, the streptomycin remaining in solution decreases. This is true also of the impurities in the solution which means that excess amounts of tertiary butyl alcohol should not be used.

When the tertiary butyl alcohol is added to the streptomycin phosphate solution, the mixture becomes milky. The mixture can be allowed to stand overnight or centrifuged in order to separate the two layers. The streptomycin separates as an oily liquid which is heavier than the other phase. In general, as the purity of the product increases this separation becomes more difficult so that a higher speed or a longer time of centrifuging is required. The streptomycin oil also becomes more viscous as the purity increases.

After the first tertiary butyl alcohol precipitation has been completed, the tertiary butyl alcohol layer is poured off and the streptomycin phosphate layer is dissolved in water and made up to a volume so that the concentration is 40,000 units/ml. Then two volumes of tertiary butyl alcohol are added and the mixture is centrifuged and separated. In order to obtain further purification, it is necessary to redissolve the streptomycin in water, for if the oily precipitate is treated with more tertiary butyl alcohol no purification takes place. It is necessary to redissolve in water before retreating with tertiary butyl alcohol in order to increase the solubility of the impurities in the tertiary butyl alcohol. Usually during the tertiary butyl alcohol precipitation, there is precipitated along with the streptomycin phosphate some material which does not redissolve. This can be separated by filtration.

In the usual procedure two to four tertiary butyl alcohol precipitations are carried out. Then after the last tertiary butyl alcohol precipitation, the streptomycin phosphate is dissolved in enough water to make a solution containing from 100,000 to 150,000 units/ml.

This tertiary butyl alcohol purification procedure will result in raising the potency of the streptomycin phosphate from 50 to 200 (or more) units per milligram over the unitage of the material before treatment.

With the other commonly used mineral acids, the tertiary butyl alcohol purification step is not as satisfactory due to an increased solubility of the streptomycin salt in alcohols. This may be overcome to some degree with the sulfate (by adding more tertiary butyl alcohol) but with the hydrochloride this procedure is difficult to carry out. In these cases, the streptomycin salt being more soluble is not thrown out of solution as completely and so a large loss results because so much is left in the tertiary butyl alcohol layer. This is also true with streptomycin acetate.

The success of this tertiary butyl alcohol purification procedure is based on the solubility relations of the streptomycin salt between water and the tertiary butyl alcohol and the use of these two in appropriate amounts to obtain the most satisfactory conditions of insolubility of streptomycin and solubility of impurities.

In addition, the tertiary butyl alcohol can be used as an inhibitor of bacterial growth when it is necessary to store streptomycin phosphate concentrates for a period of time.

In the tertiary butyl alcohol purification, there is a definite removal of color from the streptomycin phosphate solution. This does not take place with other solvents that may be used to precipitate streptomycin phosphate such as acetone, methyl, ethyl and propyl alcohol. Also these other precipitating solvents do not yield an oil that is easily worked with. In general, unless enough solvent is used to cause a powder to precipitate there is a gummy precipitate formed which sticks to the sides of the vessel and is extremely difficult to work with.

The tertiary butyl alcohol removes histamine-like substances to some extent from the streptomycin phosphate. This removal is on a small scale, clearing up small quantities of the histamine-like substances, but will not cause a streptomycin phosphate sample heavily contaminated with histamine-like substances to be rendered free of this material.

The teriary butyl alcohol procedure is also a method for reducing the pyrogen content of the streptomycin. The pyrogens are among the other impurities that are more soluble in the tertiary butyl alcohol phase. If pyrogen-free water is used to dissolve the streptomycin phase after tertiary butyl alcohol precipitation so that no new pyrogens are introduced, the pyrogen content of the streptomycin phosphate solution is reduced sufficiently to make it less difficult in a later step to remove the pyrogens completely. An additional advantage of the use of tertiary butyl alcohol is its ease of recovery for reuse, since it forms an azeotrope with water boiling at 80° C. and containing 78.24% of tertiary butyl alcohol.

Carbon cleanup

After the final concentrate has been prepared, it is necessary to free it of pyrogens. This is accomplished by using Darco G60 (commercial powdered charcoal) carbon. The amount of carbon it is necessary to use depends upon the amount of pyrogens present. From 2 to 14% or more carbon may be necessary but with usual solutions from 2 to 6% carbon is necessary to remove the pyrogens. The carbon is stirred with the streptomycin concentrate for ½ to 1 hour and is then removed by filtration. Pyrogen-free equipment is used in the processing. The carbon cake is freed as much as possible from the streptomycin solution and then is washed with a small amount of pyrogen-free water.

This final carbon cleanup step also removes color and thereby improves the appearance of the solution. The amount of color removed increases with increased amount of carbon. This step also presumably removes histamine and other toxic materials that may be present in the product.

With Darco G60 (commercial powdered charcoal), the loss incurred in this purification step is about 40,000 units per gram of carbon. This depends upon the thoroughness of the washing of the carbon free of streptomycin containing solutions adhering to it. The streptomycin adsorbed by the carbon can be recovered to an extent of about 60% by carrying it through the usual streptomycin elution procedure.

Methanol precipitation

Streptomycin phosphate is insoluble in methanol and ethanol. Streptomycin hydrochloride, sulfate and acetate are soluble in methanol (but not in ethanol). However, as one dilutes the alcohol with water, the streptomycin salt becomes more soluble in the alcohol. It has been found that in from 90 to 100% methanol, the solubility of streptomycin phosphate is so low that less than 100 to 200 units per milliliter remain in solution. If absolute methanol is added to streptomycin phosphate solution, a precipitation of the streptomycin salt takes place but a gummy mass is thrown out which, on the addition of enough alcohol to give a 90 to 95% alcohol solution, gradually changes to a hard mass which is difficult to break up.

If, however, the streptomycin phosphate is slowly added dropwise or in a fine spray to enough methanol so that the final solution contains at least 90% methanol, a fine precipitate forms which on drying in the absence of moisture forms an excellent finely divided powder. The appearance of the final product is greatly improved over a lyophilized sample since the product is so finely divided that it appears much lighter in color, and generally appears white. It is also of a sufficiently fine division so that it can be conveniently used in preparing ointments, etc.

The concentration of the streptomycin phosphate solution to be used for precipitation should be between 75,000 and 250,000 units per milliliter. If the solution is not sufficiently concentrated, an extremely fine precipitate is formed which is difficult to filter. With most samples a solution with 100,000 units per milliliter gives a precipitate which rather rapidly settles out and filters very readily. If a solution is used that is too concentrated, the streptomycin is not dispersed properly. Large drops of the streptomycin solution are only gradually dehydrated forming large granules which may not be dry in the center and which do not break up easily.

It is best to test first a small portion of the material to be precipitated to ascertain the proper concentration to be used. In most cases, it will be found that a range of from 100,000 to 150,000 units is very satisfactory but with some samples it may be found that it is necessary to use solutions of somewhat higher concentration.

Ethanol as well as methanol is equally suitable for the precipitation of streptomycin phosphate.

While the above examples describe the preferred embodiment of my invention, it will be understood that departures may be made therefrom within the scope of the specification and claims. In general, it may be said that any modifications or equivalents that would ordinarily occur to those skilled in the art are to be considered as lying within the scope of my invention.

I claim:

1. A process for refining streptomycin phosphate which comprises the steps of adding activated carbon to a filtered fermentation broth containing streptomycin with the subsequent elution of the streptomycin from the activated carbon by the addition of phosphoric acid, concentrating the substantially neutralized eluate under reduced pressure, treating the concentrate with sufficient tertiary butyl alcohol within the range of 1 to 10 volumes to cause precipitation, separating the precipitate, redissolving the precipitate in water to a concentration of at least 100,000 units/ml., adjusting the pH of this solution to about 6, adding activated carbon to remove pyrogens, and adding the streptomycin concentrate thus obtained to an alcohol to obtain a highly purified precipitate of streptomycin phosphate.

2. In a process for refining streptomycin phosphate which comprises the steps of adding activated carbon to a filtered fermentation broth containing streptomycin with the subsequent elution of the streptomycin from the activated carbon by the addition of phosphoric acid, concentrating the substantially neutralized eluate under reduced pressure, the step of treating the concentrate with sufficient tertiary butyl alcohol within the range of 1 to 10 volumes to cause precipitation, separating the precipitate, redissolving the precipitate in water to a concentration of at least 100,000 units/ml., adjusting the pH of this solution to about 6, then adding activated carbon to remove pyrogens, and adding the streptomycin concentrate thus obtained to an alcohol to obtain a highly purified precipitate of streptomycin phosphate.

DAVID L. JOHNSON.

References Cited in the file of this patent

UNITED STATES PATENTS

| Number | Name | Date |
|---|---|---|
| 1,548,566 | Volck | Aug. 4, 1925 |
| 2,446,102 | Peck | July 27, 1948 |
| 2,449,866 | Waksman et al. | Sept. 21, 1948 |
| 2,462,175 | Folkers | Feb. 22, 1949 |
| 2,521,770 | Babson et al. | Sept. 12, 1950 |
| 2,532,403 | Howe et al. | Dec. 5, 1950 |

OTHER REFERENCES

Waksman et al., Proc. Soc. Exptl. Biol. Med. v. 49 (1942) p. 207–210.

Schatz et al., Proc. Soc. Exptl. Biol. Med. v. 55 (1944) p. 66–69.

Carter et al.—Jour. Biol. Chem. vol. 160—pp. 337–342 (1945).

Waksman et al.—Jour. Pharm. Assoc.—vol. 34, Scientific Ed. pages 274–279 (1945).

Le Page et al.—Jour. Biol. Chem. vol. 162—pp. 165–166 (1946).

Woodthorpe et al.—Jour. General Microbiology —vol. 1, #3.